(12) United States Patent
Toniolo et al.

(10) Patent No.: US 10,030,505 B1
(45) Date of Patent: Jul. 24, 2018

(54) METHOD FOR MOVEMENT MEASUREMENT OF AN INSTRUMENT IN A WELLBORE

(71) Applicant: Schlumberger Technology Corporation, Sugar Land, TX (US)

(72) Inventors: Julien Toniolo, Houston, TX (US); Peter Wells, Houston, TX (US); Josselin Kherroubi, Clamart (FR); Richard Bloemenkamp, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/489,474

(22) Filed: Apr. 17, 2017

(51) Int. Cl.
*E21B 47/09* (2012.01)
*E21B 49/00* (2006.01)
*E21B 47/00* (2012.01)
*G01V 5/10* (2006.01)
*E21B 47/18* (2012.01)
*E21B 47/024* (2006.01)

(52) U.S. Cl.
CPC .......... *E21B 47/09* (2013.01); *E21B 47/0002* (2013.01); *E21B 49/00* (2013.01); *G01V 5/10* (2013.01); *E21B 47/024* (2013.01); *E21B 47/18* (2013.01)

(58) Field of Classification Search
CPC .... E21B 47/0002; E21B 47/024; E21B 47/09; E21B 47/18; E21B 49/00; G01V 5/10
See application file for complete search history.

(56) References Cited

U.S. PATENT DOCUMENTS

| 3,631,385 | A | * | 12/1971 | Silverman | G01V 1/46 |
| | | | | | 359/901 |
| 4,545,242 | A | | 10/1985 | Chan | |
| 5,019,978 | A | | 5/1991 | Howard, Jr. et al. | |
| 5,541,587 | A | * | 7/1996 | Priest | E21B 47/04 |
| | | | | | 340/854.1 |
| 6,154,704 | A | * | 11/2000 | Jericevic | E21B 47/04 |
| | | | | | 702/6 |
| 6,256,587 | B1 | * | 7/2001 | Jericevic | E21B 47/04 |
| | | | | | 702/6 |
| 6,736,210 | B2 | | 5/2004 | Hosie et al. | |
| 9,181,796 | B2 | | 11/2015 | Malone et al. | |
| 2002/0032529 | A1 | | 3/2002 | Duhon | |
| 2004/0118611 | A1 | | 6/2004 | Runia et al. | |
| 2006/0047430 | A1 | * | 3/2006 | Edwards | G01V 9/00 |
| | | | | | 702/6 |
| 2006/0071663 | A1 | * | 4/2006 | Stanley | F16L 55/28 |
| | | | | | 324/323 |

(Continued)

FOREIGN PATENT DOCUMENTS

WO WO2011097110 A1 8/2011

*Primary Examiner* — Mark R Gaworecki
(74) *Attorney, Agent, or Firm* — Sara K. M. Hinkley (57) ABSTRACT

A method for determining a depth related parameter of an instrument in a wellbore includes measuring movement of the instrument along the wellbore using a wheel sensor urged into contact with a wall of the wellbore. Movement of an instrument conveyance is measured proximate the surface. Measurements from the wheel sensor are calibrated using measurements of movement of the instrument conveyance. The depth related parameter of the instrument is determined using the calibrated wheel sensor measurements.

13 Claims, 8 Drawing Sheets

(56) References Cited

U.S. PATENT DOCUMENTS

| | | | |
|---|---|---|---|
| 2008/0156477 A1* | 7/2008 | Aivalis | E21B 23/00 166/53 |
| 2010/0300685 A1* | 12/2010 | Del Campo | E21B 17/003 166/254.2 |
| 2012/0186874 A1 | 7/2012 | Malone et al. | |
| 2014/0174733 A1* | 6/2014 | Gadot | E21B 41/0085 166/264 |
| 2016/0032711 A1 | 2/2016 | Sheiretov et al. | |
| 2017/0115420 A1* | 4/2017 | Cazeneuve | G01V 1/50 |

\* cited by examiner

METHOD FOR MOVEMENT MEASUREMENT OF AN INSTRUMENT IN A WELLBORE

CROSS-REFERENCE TO RELATED APPLICATIONS

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND

This disclosure is related to the field of measuring instruments and/or wellbore intervention instruments for determining petrophysical properties of subsurface formations traversed by a wellbore and/or performing intervention operations in wellbores. More specifically, the disclosure relates to improving accuracy of measurement of axial position (depth) of such instruments in a wellbore.

U.S. Patent Application Publication No. 2016/0032711 describes an apparatus for measuring movement of a wellbore measuring instrument or intervention apparatus along the interior of a wellbore. The instrument or apparatus may be moved along the wellbore using a winch and cable, coiled tubing, drill pipe, jointed tubing, tractor or any other known conveyance. A record is made of the movement of the conveyance proximate the earth's surface. Because the conveyance may be of considerable length, correspondence between movement of the conveyance at the surface and the wellbore instrument or apparatus may be inaccurate. This is particularly the case where the instrument or apparatus undergoes "stick-slip" motion, wherein the instrument or apparatus momentarily is stopped by one or more types of obstruction in the wellbore. While the instrument or apparatus is stationary during stick times, the value of the surface measurement of the conveyance continues to change. This process may continue until the instrument or apparatus is freed from being stuck. At such time the instrument or apparatus may accelerate until excess tension or compression in the conveyance is relieved. The '711 publication describes measuring wheels placed in contact with the wall of the wellbore and accelerometers that in combination make measurements of movement of the instrument or apparatus proximate thereto so that effects of elongation and/or shortening of the conveyance not directly resulting from operation of the conveyance at the surface may be attenuated and a more accurate determination of instrument or apparatus movement may be made.

According to the disclosure of the '711 publication an embodiment of an apparatus for measuring at least one of downhole position and velocity includes a body. A roller is connected with the body, and a plurality of sensors is connected with the body. The plurality of sensors acquires roller data and wellbore data. The roller data and wellbore data are used to determine the velocity, position, or both of the apparatus. The apparatus also includes an electronic module. The electronic module is in communication with the set of sensors. An example method of monitoring an apparatus in a wellbore includes acquiring roller data related to the number of revolutions of a roller connected to a body of an apparatus. The example method also includes acquiring wellbore data related to wellbore properties, transmitting the roller data and wellbore data to a processor. The example method further includes determining at least one of velocity of the apparatus and position of the apparatus in the wellbore. An example method of monitoring an apparatus in a wellbore includes measuring the number of revolutions of a roller connected with an apparatus, and acquiring wellbore data related to formation properties. The method also includes determining the velocity of the apparatus using the wellbore data and the measured number of revolutions.

The foregoing methods and apparatus according to the '711 publication assume accurate correspondence between motion of the instrument and rotation of the wheel(s). Wellbore and/or formation conditions may make such assumption inaccurate.

SUMMARY

A method according to one aspect of the present disclosure for determining a depth related parameter of an instrument in a wellbore includes measuring movement of the instrument along the wellbore using a wheel sensor urged into contact with a wall of the wellbore. Movement of an instrument conveyance is measured proximate the surface. Measurements from the wheel sensor are calibrated using measurements of movement of the instrument conveyance. The depth related parameter of the instrument is determined using the calibrated wheel sensor measurements.

Other aspects and advantages will be apparent from the description and claims that follow.

DETAILED DESCRIPTION

Figure 1A:
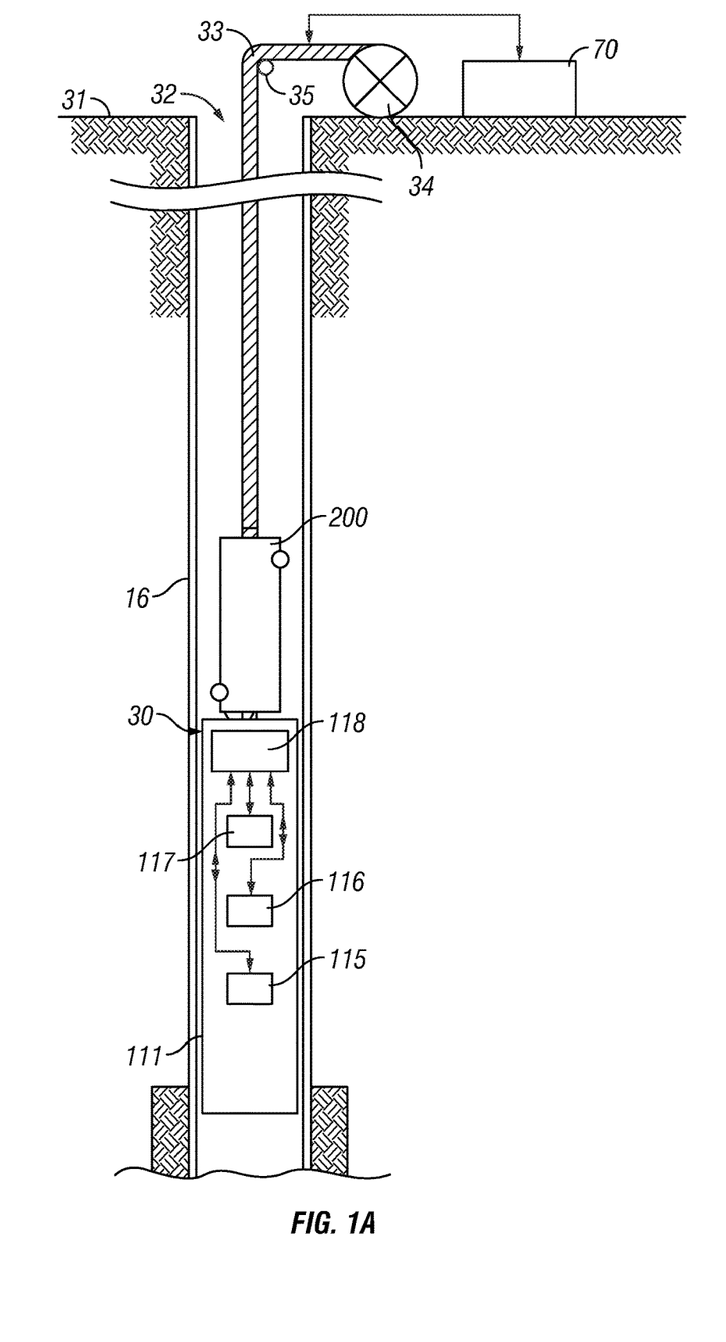
FIG. 1A shows an example well logging instrument conveyed through a wellbore by an electrical cable ("wireline").

FIG. 1A shows an example well logging instrument 30. The measurement components of the instrument 30 may be disposed in a housing 111 shaped and sealed to be moved along the interior of a wellbore 32. The instrument housing 111 may contain at least one energy source 115, e.g., a neutron source such as electrically operated pulsed neutron source (hereinafter "source"), and one or more detectors 116, 117 each disposed at different axial spacings from the source 115. The source 115 may emit neutron radiation. Shielding (not shown) may be disposed in the housing 111 between the source 115 and the detectors 116, 117 to reduce direct transmission of neutrons from the source 115 to the detectors 116, 117. Thus, detected radiation may be characterized at each of a plurality of distances from the source 115, and thus have different lateral response (depth of investigation) into the formations surrounding the wellbore 32. In some example embodiments, two or more different types of well logging instruments, each having a different type of source and different types of corresponding detectors may be included in the same instrument assembly of "tool string." The well logging instrument 30 shown in and described with reference to FIG. 1A is only provided as an example and is not intended to limit the scope of well logging instruments that may be used in accordance with the present disclosure in any way.

The instrument housing 111 maybe coupled to an armored electrical cable 33 that may be extended into and retracted from the wellbore 32. The wellbore 32 may or may not include metal pipe or casing 16 therein. The cable 33 may conduct electrical power to operate the instrument 30 from a surface 31 deployed recording system 70, and signals from the detectors 116, 117 may be processed by suitable circuitry 118 for transmission along the cable 33 to the recording system 70. The recording system 70 may include a processor, computer or computer system as will be explained below with reference to FIG. 3 for analysis of the detected signals as well as devices for recording the signals communicated along the cable 33 from the instrument 30 with respect to depth and/or time. The cable 33 may be extended into and retracted from the wellbore 32 by means of a winch 34 or similar apparatus. The amount of movement of the cable 33 may be measured at the surface by a contact wheel 35 pressed against the exterior of the cable 33 or similar apparatus. The contact wheel 35 may be in signal communication with the recording system 70, using, for example a rotary position encoder. The foregoing implementation of at-surface cable motion measurement is not intended to limit the scope of the present disclosure.

Figure 2:
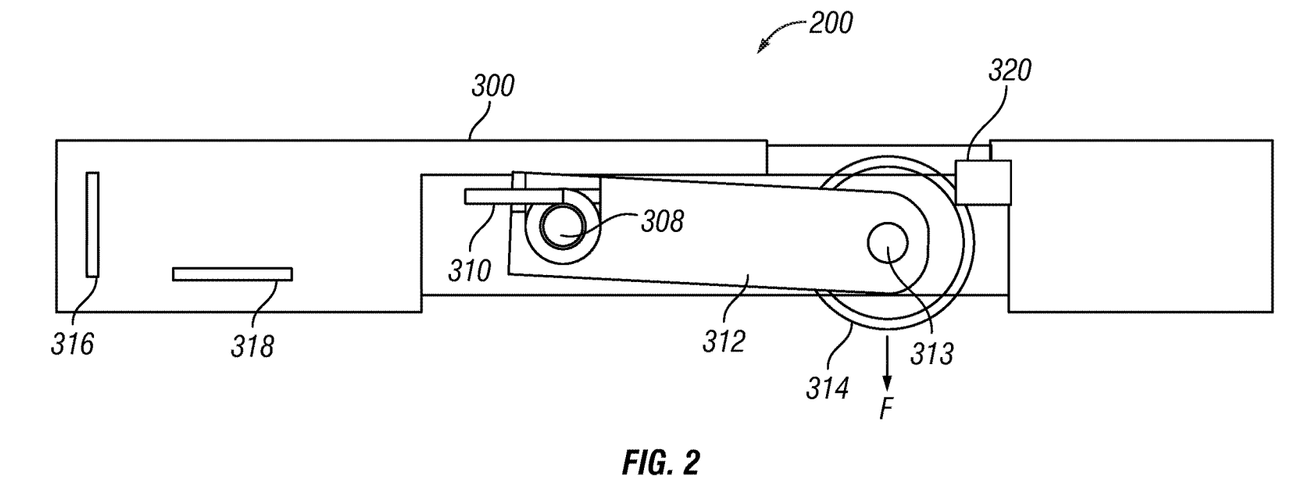
FIG. 2 shows a side view of an example embodiment of a wheel sensor.

In the embodiment of FIG. 1A, a wheel type movement measurement apparatus 200 may be connected to the well logging instrument 30 or in a string of such well logging instruments. The wheel type movement measurement apparatus will be further explained with reference to FIGS. 2A through 2C.

The well logging tool(s) described above may also be embodied, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. In some embodiments, the drill string 214 and drill bit 216 may be rotated from the surface by a "top drive" type of drilling rig. Measurement of axial movement of the kelly 220, the swivel 224 and/or the hook may be made using a linear position sensor 219 such as a linear variable differential transformer, a rotary encoder (not shown) coupled to a drawworks drum (not shown) used to raise and lower the hook 222, swivel 224 and kelly 220 (or a top drive in drilling units having such equipment). Measurements of movement of the hook, kelly, swivel or top drive may be communicated to a processor 248 and recorder 250 for processing as will be further explained below.

Figure 1B:
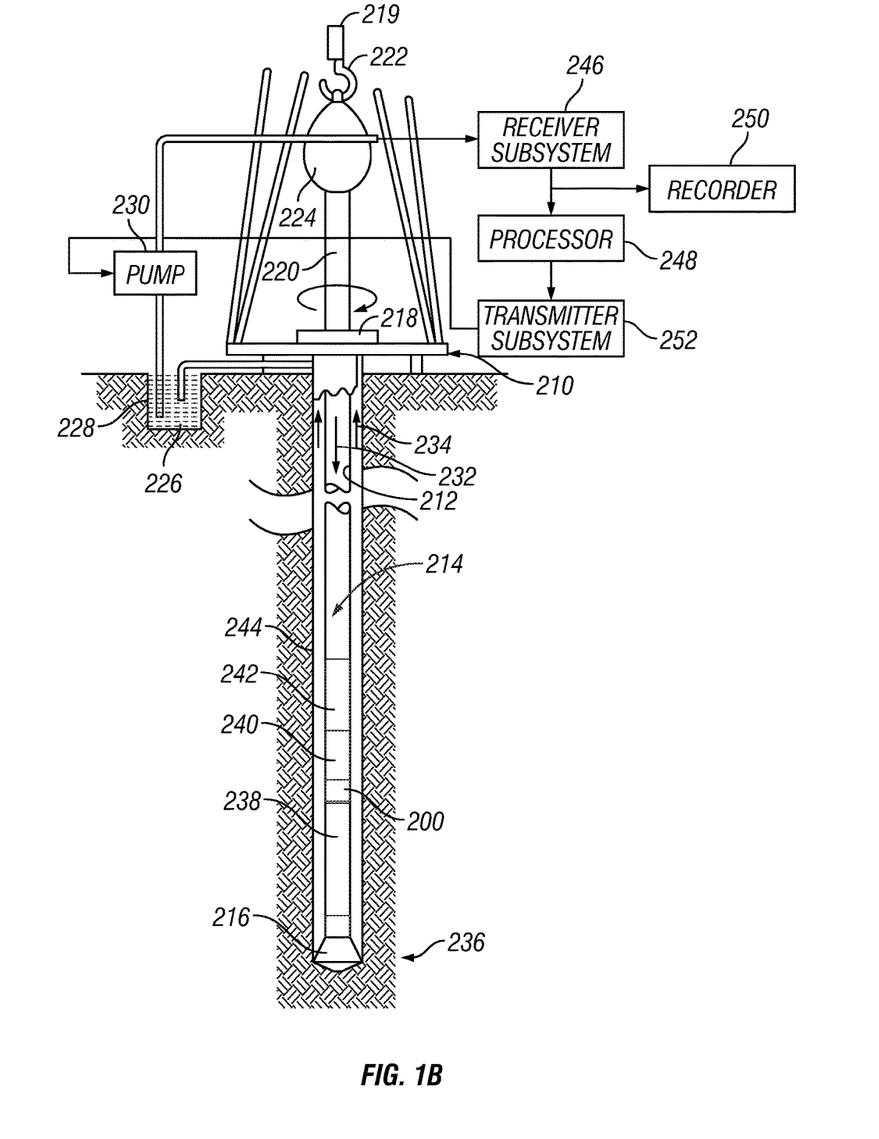
FIG. 1B shows an example logging while drilling instrument on a drill string.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be used.

A bottom hole assembly ("BHA") 236 may be mounted within the drill string 214, preferably near the drill bit 216. The BHA 236 may include subassemblies for making measurements, processing and storing information and for communicating with the Earth's surface. Such measurements may correspond to those made using the instrument string explained above with reference to FIG. 1A. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions as well as on the demands of the measurement.

In the arrangement shown in FIG. 1B, the components of the well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 may also include conventional acquisition and processing electronics (not shown) comprising a microprocessor system (with associated memory, clock and timing circuitry, and interface circuitry) capable of timing the operation of the source and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing computations may be performed on a computer system such as one shown in the processor at 248 in FIG. 1B, or in the surface unit 70 in FIG. 1A. However, any computer or computers may be used to equal effect.

In the embodiment of FIG. 1B, a wheel type movement measurement apparatus 200 may be connected to the drill collar section 240 or in a string of MWD and/or LWD instruments. The wheel type movement measurement apparatus 200 ("wheel sensor" hereinafter for convenience) may be similar in structure for both the example embodiment shown in FIG. 1A and the example embodiment shown in FIG. 1B.

It is also to be clearly understood that conveyance of instruments such as well logging instruments and various embodiments of the wheel sensor 200 is not limited to cable or drill string conveyance as illustrated, respectively, in FIG. 1A and FIG. 1B. Any other conveyance known in the art, for example and without limitation coiled tubing, jointed tubing and slickline may be used with the wheel sensor 200 to equal effect. For conveyances that have the capability of moving instruments or tools into the wellbore, for example, coiled tubing, jointed tubing and drill pipe, measurement of a parameter related to instrument or tool depth may be made while moving the instrument or tool into the wellbore as well as while moving the instrument or tool out of the wellbore.

An example embodiment of the wheel sensor 200 will be explained with reference to FIG. 2. The wheel sensor 200 may be disposed in a main housing 300. The main housing 300 may be configured to couple within any of the tool string shown in FIG. 1A, in the drilling tool string shown in FIG. 1B, or any other type of wellbore intervention tool or tool string The main housing 300 may be substantially cylindrically shaped at each longitudinal end. A recessed section 311 in the exterior of the housing 300 may have a length and shape designed to provide a place for a wheel sensor housing 312 and attached wheel 314.

The wheel sensor housing 312 may comprise a hinge pin 308 that couples the wheel sensor housing 312 pivotally to the main housing 300. The wheel 314 may be rotatably coupled to the main housing 300 by an axle 313. The wheel sensor housing 312 may be biased outwardly from the main housing 300 using, for example, a torsion spring 310 disposed about the hinge pin 308. The wheel 314 may be functionally coupled to a rotation sensor 320, which generates motion signals when the wheel 314 rotates. In some embodiments, the wheel 314 may be made from nonmagnetic material and have embedded therein a plurality of rotationally spaced apart magnets (not shown) so that the wheel 314 may trigger the rotation sensor 320 without the need for direct contact between the rotation sensor 320 and the wheel 314. In other embodiments, the rotation sensor 320 may be a rotary position encoder rotationally coupled, directly or through suitable gearing, to the wheel 314. Irrespective of the particular embodiment, rotation of the wheel 314 results in the rotation sensor 320 generating signals corresponding to the rotation of the wheel 314. Such signals may include, for example, voltage pulses from a sensing coil (not shown) in the rotation sensor as the above-described magnets in the wheel 314 move past the rotation sensor.

Outward force F generated by the torsion spring 310 may be transmitted to the wheel 314, thus urging the wheel 314 to remain in contact with the wellbore wall and thereby convert motion of the wheel sensor 200 along its longitudinal axis into rotational motion of the wheel 314 (which will be converted into motion signals by the rotation sensor 320).

FIG. 2 also shows accelerometers 316, 318 disposed in the housing 300 for making measurements corresponding to change in velocity of the wheel sensor 200 along the longitudinal axis (sensor 318) and along one or two axes that are orthogonal (e.g., sensor 316) to the longitudinal axis in order to detect rotation of the housing 300 about its longitudinal axis. The use of the measurements from the accelerometers 316, 318 will be further explained below.

A non-limiting example embodiment of using the wheel sensor as described with reference to FIG. 3. which shows a wellbore 401 formed in an underground formation 402, the wellbore 401 being filled with, e.g., drilling fluid. The wellbore 401 may have an upper portion provided with a casing 404 extending from a drilling rig (not shown) at the Earth's surface 408 into the wellbore 401 to a casing shoe 405, and an open lower portion 407 extending below the casing shoe 405. A conduit, which in the present embodiment may be a tubular drill string 409 containing a body of drilling fluid 410 and having an open lower end 411, extends from the drilling rig (not shown) into the wellbore 401 whereby the open lower end 411 is disposed in the open lower wellbore portion 407. A well logging instrument 412 capable of being lowered or raised through the drill string 409, is retrievably suspended in the drill string 409 by a deployment device. The well logging instrument 412 may include one or more types of sensors, including, for example and without limitation, a formation electrical imaging tool 414 having one or more retractable arms 416. The logging instrument 412 may include a fluid pressure pulse device 418 arranged at the upper end of the imaging tool 414, whereby the imaging tool 414 extends below the lower end part 411 of the drill string 409 and the pressure pulse device 418 is disposed within the drill string 409. The imaging tool 414 may be powered by a battery (not shown) and can be provided with an electronic memory (not shown) or other recording medium for storing measurement data, which for the electrical imaging tool 414 may include measurements of resistivity of the formation made at the end of the one or more extensible arms 416. The wheel sensor is shown at 200.

Figure 3:
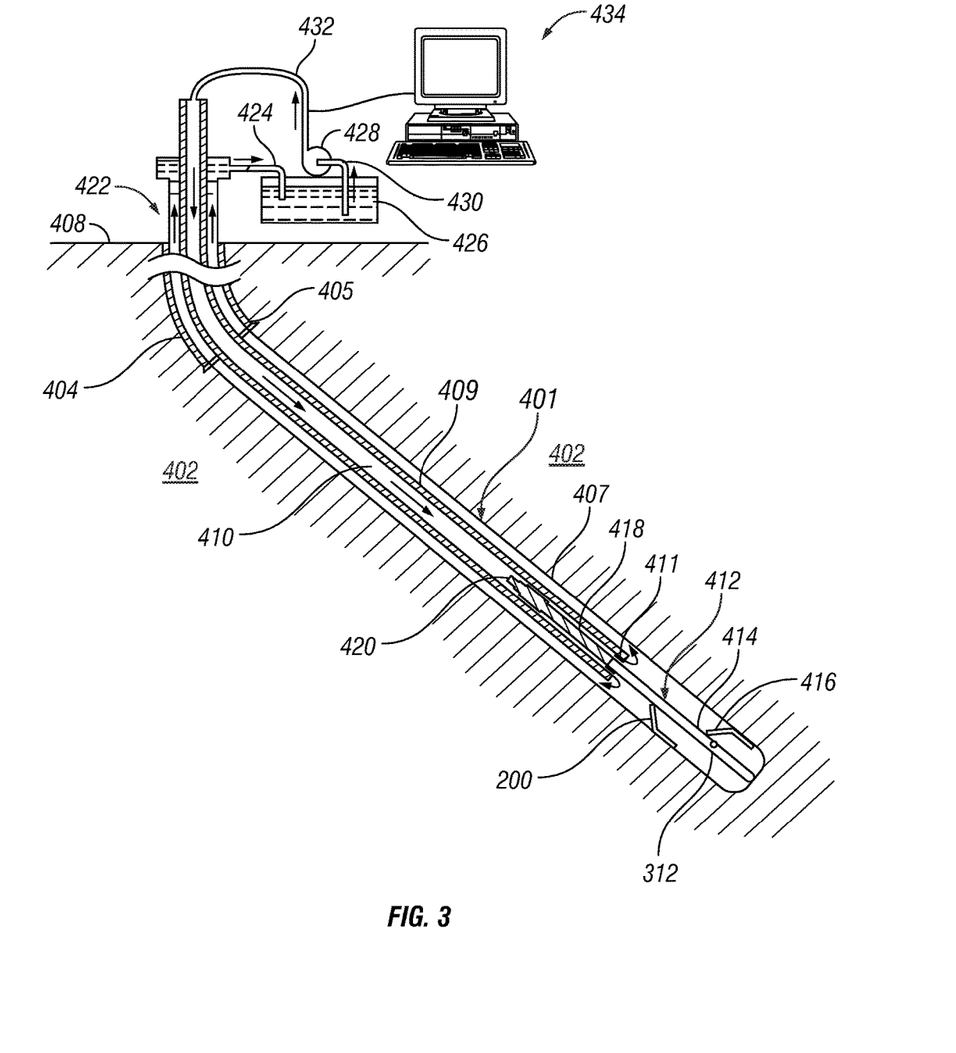
FIG. 3 shows moving a well logging instrument having a wheel sensor as in FIG. 2 may be used when conveying a well logging instrument into a drill pipe from an open wellbore.

It is to be clearly understood that the imaging tool 414 shown in FIG. 3 is only an example of a well logging sensor or instrument that may be used with a wheel sensor 200 according to the present disclosure. It is within the scope of this disclosure that any known well logging sensor or instrument that can be moved through the inside of a tube or conduit may be used with a deployment device according to the present disclosure. Such sensors and/or instruments include, without limitation, acoustic sensors, electromagnetic resistivity sensors, galvanic resistivity sensors, seismic sensors, Compton-scatter gamma-gamma density sensors, neutron capture cross section sensors, neuron slowing down length sensors, calipers, gravity sensors and the like.

The fluid pressure pulse device 418 has a variable flow restriction (not show) which is controlled by electric signals transmitted by the imaging tool 414 to the pressure pulse device 418, which signals represent part of the data produced by the imaging tool 414 during the making of measurements of the earth formation 2. The upper end of the deployment device may be provided with a latch 420 for latching of an armored electrical cable (not shown) to the device for retrieval of the instrument 412 from the bottom of the drill string 409.

A wellhead 422 may be connected to the upper end of the casing 404 and may be provided with an outlet conduit 424 terminating in a drilling fluid reservoir 426 provided with a suitable sieve means (not shown) for removing drill cuttings from the drilling fluid. A pump 428 having an inlet 430 and an outlet 432 is arranged to pump drilling fluid from the fluid reservoir 426 into the upper end of the drill string 409.

A control system 434 located at the Earth's surface is connected to the drill string 409 for sending or receiving fluid pressure pulses in the body of drilling fluid 410 to or from the fluid pressure pulse device 418.

The embodiment shown in FIG. 3 may be used, for example in "through the drill bit" well logging operations, for example and without limitation as described in U.S. Patent Application Publication No. 2004/0118611 filed by Runia et al.

The example embodiment of an electrical imaging tool 414 shown in FIG. 3 may be used to generate data corresponding to a visual image of the wall of the wellbore. Such data may be used for making geologic interpretation as to the composition and/or structure of formations adjacent to the wellbore. In some example embodiments, the data when represented in the form of visual images may be used, for example and without limitation, to determine the presence of fractures intersecting the wellbore wall. The electrical imaging tool 414 may comprise rows of electrodes (not shown separately), wherein each row extends a selected distance in the direction transverse to the longitudinal axis of the electrical imaging tool 414. The rows may be separated or offset from each other by a predetermined longitudinal distance. One possible embodiment of a method according to the present disclosure is to cause measurements from such longitudinally offset sensors to be placed on a common depth reference, or depth aligned.

Figure 4:
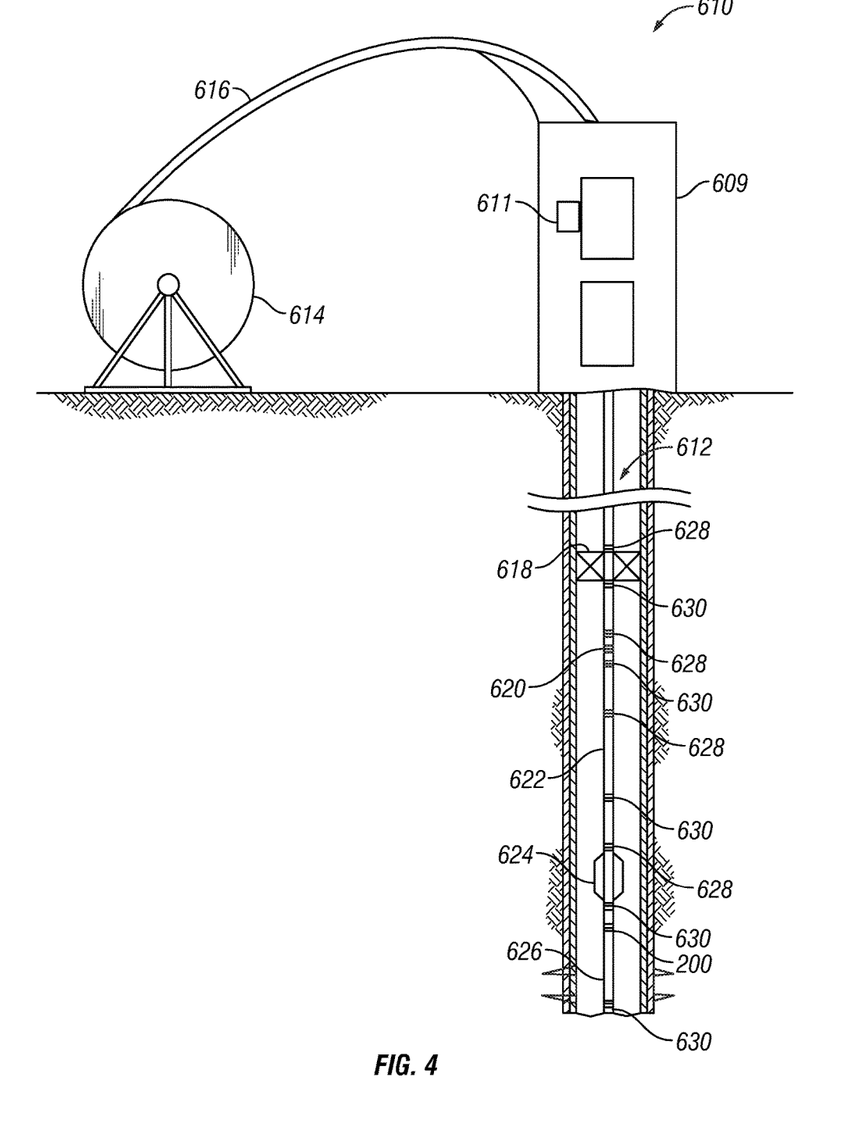
FIG. 4 shows conveyance of well logging instruments through a wellbore using coiled tubing.

FIG. 4 shows an apparatus 610 which uses coiled tubing to convey well logging instruments into and out of the wellbore. In the apparatus 160, a continuous tubing string 612 known in the art is deployed into a wellbore by unwinding it from a reel 614. Since the tubing string 612 is initially wrapped on the reel 614, such continuous tubing strings are commonly referred to as "coiled tubing" strings. As used herein, the term "continuous" means that the tubing string is deployed substantially continuously into a wellbore, allowing for some interruptions to interconnect certain tool assemblies therein, as opposed to the manner in which segmented or "jointed" tubing is deployed into a wellbore by threadedly coupling together individual "joints" or "stands" limited in length by the height of a rig supporting structure ("derrick") at the wellbore.

Movement of the coiled tubing string into and out of the wellbore may be measured using, for example, a contact sensor 611 disposed in or proximate to a tubing injector 609. Measurements of the movement of the coiled tubing correspond to other surface measurements made, for example, using the apparatus shown in FIG. 1A and FIG. 1B.

The vast majority of the tubing string 612 consists of tubing 616. The tubing 616 may be made of a metallic material, such as steel, or it may be made of a nonmetallic material, such as a composite material, including, for example, fiber reinforced plastic. As described below connectors in the tubing string permit tool assemblies to be inserted into the interior of the tubing string 612 for movement to the bottom of the tubing string 612 and/or beyond the bottom thereof.

In the apparatus 610, wellbore tool assemblies 618 (a packer), 620 (a valve), 622 (a sensor apparatus), 624 (a wellbore screen) and 626 (a spacer or blast joint) can be interconnected in the tubing string 612 without requiring splicing of the tubing 616 at the wellbore, and without requiring the tool assemblies to be wrapped on the reel 614. In the present example embodiment, connectors 628, 630 may be provided in the tubing string 612 above and below, respectively, each of the tool assemblies 618, 620, 622, 624, 626, 200. These connectors 628, 630 may be included into the tubing string 612 prior to, or as, it is being wrapped on the reel 614, with each connector's position in the tubing string 612 on the reel 614 corresponding to a desired location for the respective tool assembly in the wellbore.

The tool assemblies 618, 620, 622, 624, 626 may also be various forms of wellbore logging (formation evaluation) and drilling sensors, including but not limited to acoustic sensors, natural or induced gamma radiation sensors, electromagnetic and/or galvanic resistivity sensors, gamma-gamma (photon backscatter) density sensors, neutron porosity and/or capture cross section sensors, formation fluid testers, mechanical stress sensors, mechanical properties sensors or any other type of wellbore logging and formation evaluation sensor known in the art. Such sensors may include batteries (not shown) or turbine generators (not shown) for electrical power. Signals detected by the various sensors may be stored locally in a suitable recording medium (not shown) in each tool assembly, or may be communicated to the Earth's surface using suitable telemetry, such as mud pulse telemetry, electromagnetic telemetry, acoustic telemetry, electrical telemetry along a cable inside or outside the tubing string 612 or in cases where the tubing string 612 is made from a composite material having electrical lines therein, as will be explained in more detail below, telemetry can be applied to the electrical lines for detection and decoding at the Earth's surface. Signals, such as operating commands, or data, may also be communicated from the Earth's surface to the tool assemblies in the well using any known type of telemetry.

The connectors 628, 630 may be placed in the tubing string 612 at appropriate positions, so that when the tool assemblies 618, 620, 622, 624, 626, 200 are interconnected to the connectors 628, 630 and the tubing string 612 is deployed into the wellbore, the tool assemblies 618, 620, 622, 624, 626 will be disposed at their respective desired locations in the wellbore. In the case of wellbore logging sensors, the coiled tubing may be extended into the wellbore and/or retracted from the wellbore in order to make a record of the various sensor measurements with respect to depth in the wellbore. A wheel sensor 200 as in the embodiments described with reference to FIGS. 1A, 1B and 3 may be provided and used as explained herein.

The tubing string 612 with the connectors 628, 630 therein is wrapped on the reel 614 prior to being transported to the wellbore. At the wellbore, the tool assemblies 618, 620, 622, 624, 626 are interconnected between the connectors 628, 630 as the tubing string 612 is deployed into the wellbore from the reel 614. In this manner, the tool assemblies 618, 620, 622, 624, 626 do not have to be wrapped on the reel 614 or be transported around the gooseneck (not shown).

During wellbore intervention operations when the tool or instrument having the wheel sensor 200 attached is moved along the wellbore, such motion may include changes in speed of the instrument or tool. Such changes may include, for example and without limitation, slowing down because of increased friction between the tool and the wellbore (or the drill string shown in FIG. 1B and the wellbore), and so called "stick slip" motion wherein the tool or instrument momentarily stops, while the value of the surface measurement of the depth related parameter such as that generated by the contact wheel (e.g., at 35 in FIG. 1A or as explained with reference to FIG. 1B) continues to change. Irrespective of the reason for the change in instrument or tool speed, such changes result in the apparent depth measured at the surface becoming uncorrelated with the actual depth of the instrument in the wellbore. In embodiments of a method according to the present disclosure, measurements from the wheel sensor 200 may be combined with depth measurements made at the surface (as explained with reference to FIGS. 1A and 1B) to provide a more accurate determination of instrument or tool depth at any time.

Figure 5A:
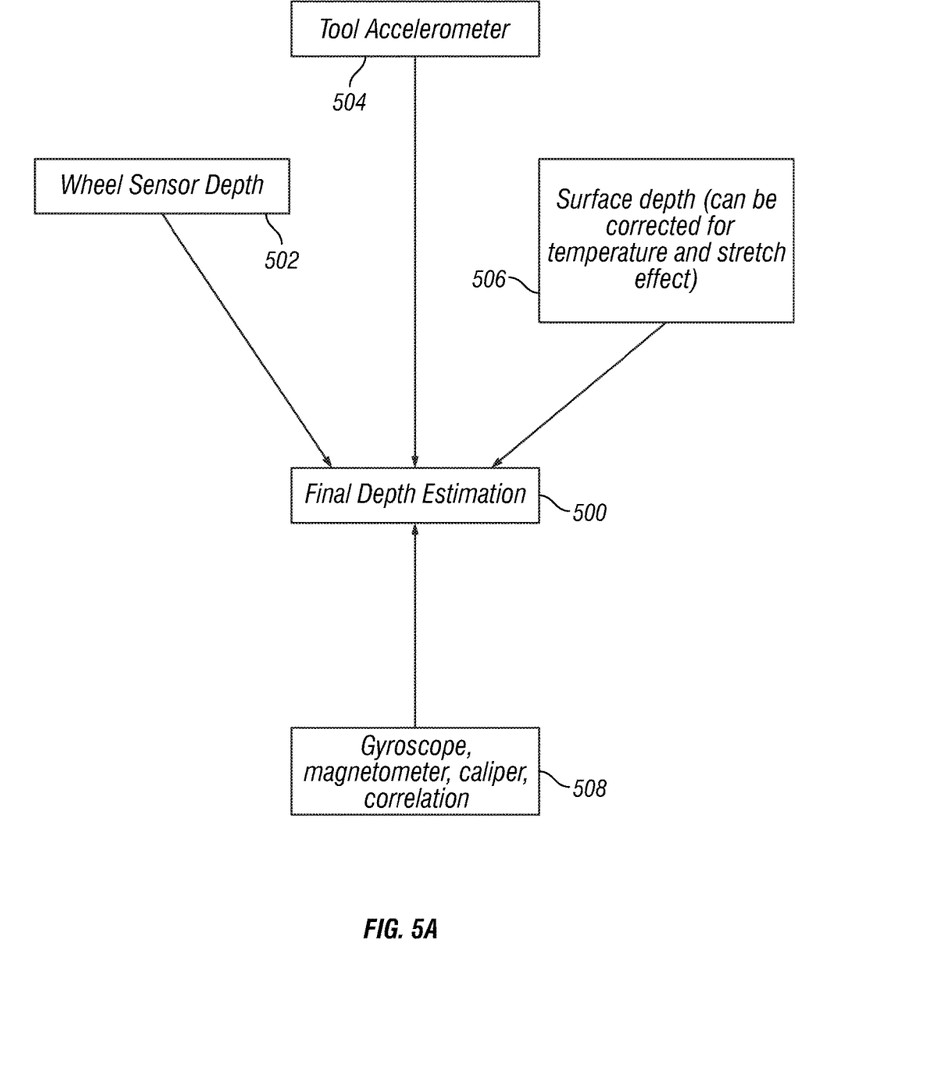
FIG. 5A shows a general flow chart of an example embodiment of instrument or tool depth-related parameter determination according to the present disclosure.

FIG. 5A shows a flow chart of one example embodiment of well tool or instrument depth-related parameter determination according to the present disclosure. In the present context, a "depth-related parameter" may comprise any or all of instrument depth; instrument speed; and relative instrument depth with respect to some other depth reference. "Depth related parameter" may also comprise measurements of a time-interval between a moment $t_1$ that a first (e.g., upper) sensor passes a certain event in the formation and a moment $t_2$ that a second (e.g., lower) sensor passes by the same formation event. Such events may include, for example, a first row of electrodes on the electrical imaging tool (414 in FIG. 3) moving past a resistivity contrasting feature in the formation following by a second row of electrodes spaced apart longitudinally from the first row then passing the same feature. The same principle may apply to the longitudinally offset sensors shown in FIG. 1A at 116 and 117. Depth related parameter may also comprise a number of measurement samples indicative of such time interval or depth interval. Depth related parameter may also comprise a depth-shift parameter such as an image depth shift parameter derived from the wheel sensor measurement and surface conveyance measurement used to place data from a longitudinally offset sensor side-by-side with image data in a geologically meaningful way. The foregoing may be referred to as depth alignment of measurements made by two longitudinally offset sensors.

At 506, a depth-related parameter of the well tool, instrument or tool string may be initially estimated by using measurements, e.g., from the contact wheel (35 in FIG. 1A) as the cable (33 in FIG. 1A) is extended into the wellbore (32 in FIG. 1A). The measurements of depth made using, e.g., a cable may be further corrected for temperature along the length of the cable and the axial force (tension) on the cable with the instrument or tool suspended in the wellbore. With reference to the embodiment of FIG. 1B, measurements of movement of the kelly or top drive for each segment of drill string and a sum of the lengths of all the segments of drill string inserted into the wellbore may also be used for the initial depth estimate.

As the instrument or tool (e.g., 30 in FIG. 1) is inserted into or withdrawn from the wellbore, the wheel sensor (200, see FIG. 2) may make measurements corresponding to the motion of the tool along the wellbore. The foregoing is shown at 502. At selected tool movement intervals, the movement measurements made by the wheel sensor 200 may be compared with the measurements made by the contact wheel (35 in FIG. 1A) or the kelly/top drive movement (see FIG. 1B), i.e., measurements of conveyance movement made at the surface. Because the motion of the cable or the drill string (or other conveyance) measured at the surface is a readily measured quantity, comparing the foregoing measured movement with measurements of movement made by the wheel sensor 200 may enable the wheel sensor 200 to be calibrated. "Calibrated" in the present context may mean determining correspondence of wheel sensor rotation to measured movement at the surface. Thus, effects of bias (offset) and gain in the wheel sensor 200 measurements with respect to actual tool or instrument movement along the wellbore may be accounted for in the determination of tool motion at the wheel sensor 200. During movement of the instrument or tool along the wellbore, in some intervals the tool or instrument may be slowed or momentarily stuck, or the wheel on the wheel sensor 200 may not be in contact with the wellbore wall. In such intervals, as shown at 504, measurements from the accelerometer sensitive to motion or acceleration along the longitudinal direction (i.e., accelerometer 318 in FIG. 2) of the wheel sensor 200, may be used to determine if the wheel sensor 200, and thus the tool(s) in the wellbore have slowed or stopped moving. Slowing or stopping moving of the tool may be determined by integrating the measurements of the accelerometer (318 in FIG. 2) to determine tool speed with respect to time. If zero tool speed is indicated by the integrated accelerometer measurements, then the corresponding zero tool movement measurements made by the wheel sensor 200 may be used to determine that the tool depth (longitudinal position along the wellbore) has not changed. If the integrated accelerometer measurements indicate the tool(s) are still moving, but the signal from the wheel sensor 200 indicates no motion then it may be assumed, for example, that the wheel sensor 200 has lost contact with the wellbore wall. For any such intervals where the wheel sensor 200 has lost contact, correspondence of the wheel sensor measurements with the surface motion measurements may be edited out of the surface-derived measurements used to calibrate the wheel sensor 200 to the surface motion measurements. At 508, additional measurements such as from gyroscopes, magnetometers, gamma ray sensors and caliper measurements, among other measurements, may be used to locate the actual position of the tool or instrument in the wellbore, for example, with respect to fixed, known references or by correlation with other references.

At 500, the foregoing measurements from the wheel sensor 200, accelerometer (318 in FIG. 2) and surface-measured motion may be combined to provide a final depth-related parameter estimation of the tool at any moment in time. Such combination may include "coarse" measurement of an instrument or tool depth-related parameter made using surface measurements, e.g., from the contact wheel (35 in FIG. 1A) adjusted by higher resolution measurements made by the wheel sensor 200 along each interval for which the wheel sensor is calibrated as explained above.

Figure 5B:
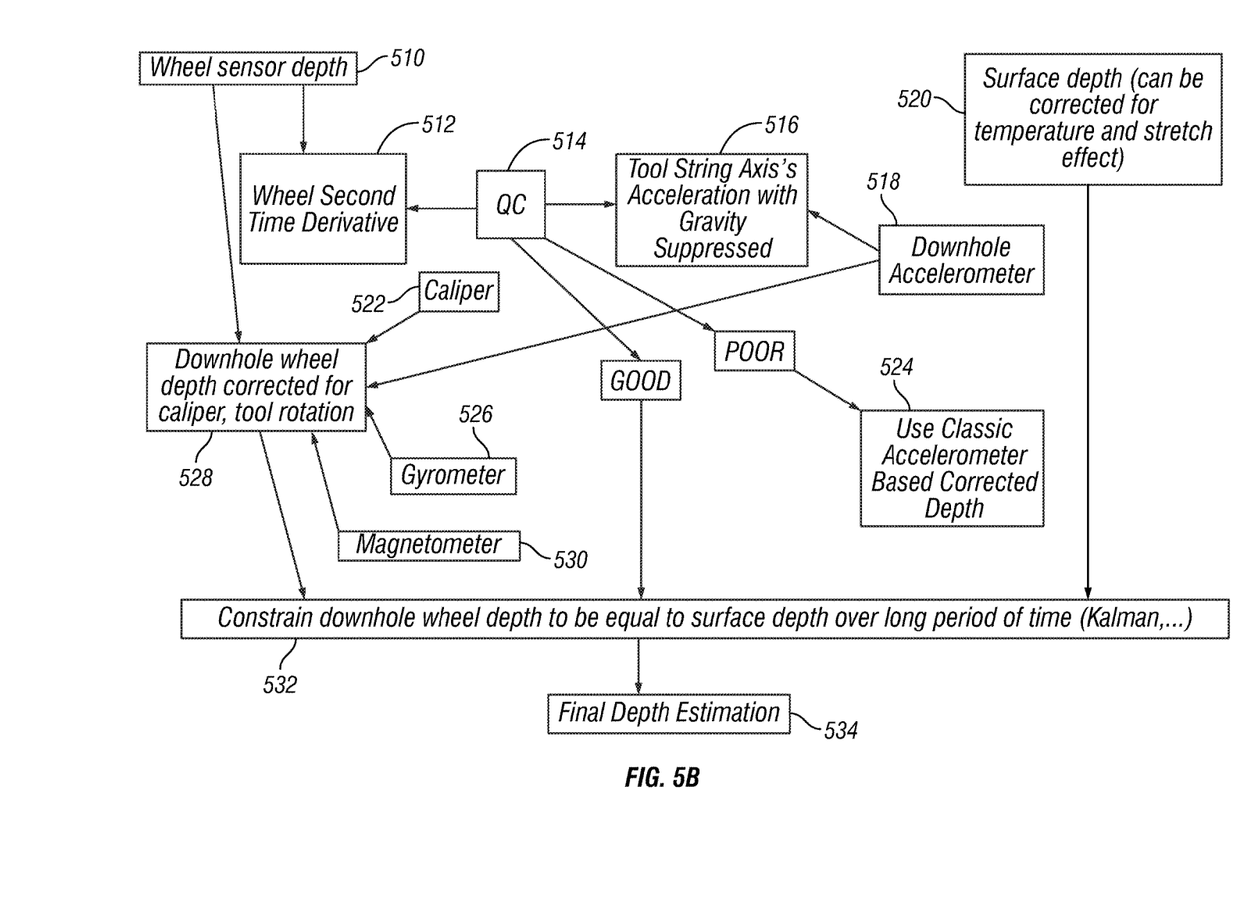
FIG. 5B shows a more detailed flow chart of one example embodiment of tool depth-related parameter determination according to the present disclosure.

In FIG. 5B, the wheel sensor measurements at 510 and the surface measurements at 520 may be used substantially as explained with reference to FIG. 5A. At 516, the acceleration measurements (e.g., from accelerometer 318 in FIG. 2) may be doubly integrated to estimate an amount of motion of the instrument or tool along the instrument axis. Similarly, at 512, the wheel sensor measurements may be used to determine a different estimate of an amount of tool motion along the instrument axis. If at 514 the doubly integrated acceleration measurements and the wheel sensor movement measurements correspond or differ to within a selected tolerance, i.e., at most a selected threshold amount, then the quality of the wheel sensor measurements may be determined to be acceptable for further use. If the between the integrated accelerometer measurements and the wheel sensor measurements exceeds a selected threshold (either the same of a different threshold as the previous threshold) then the measurements of tool motion from the wheel sensor measurements in such affected intervals may be edited out of the calculation of a depth-related parameter. In the present embodiment, the further use may be as shown at 528, where the surface measurements (e.g., from contact wheel 35 in FIG. 1A) are used to calibrate wheel sensor bias and gain as explained with reference to FIG. 5A. Such calibrated wheel sensor measurements may be combined with the surface measurements to determine a depth-related parameter of the tool at any moment in time. If and as necessary, the measurements from the wheel sensor may be supplemented by other measurements such as gyroscope measurements at 526 and magnetometer measurements at 530.

At 518, the accelerometer (318 in FIG. 2) may be used substantially as explained with reference to FIG. 5A to determine whether the tool or instrument is moving so that affected wheel sensor measurement intervals may be determined to be usable or not.

At 532, the calibrated wheel measurements may be combined with the surface measurements, resulting at 534 in a final depth-related parameter measurement.

At 522, measurements of the diameter of the wellbore, e.g., as may be obtained from a caliper disposed in the tool or instrument or tool string, may be used to further refine measurements made by the wheel sensor. One example method for refining wheel sensor measurements using wellbore diameter measurements is described in U.S. Patent Application Publication No. 2016/0032711 filed by Sheiretov et al.

In the event the comparison at 514 is not within a selected tolerance, then the instrument depth determination may omit measurements from the wheel sensor and revert to an accelerometer based method such as described, for example in U.S. Pat. No. 5,019,978 issued to Howard, Jr. et al., it being assumed in such cases that the wheel sensor data may be unreliable.

Figure 6:
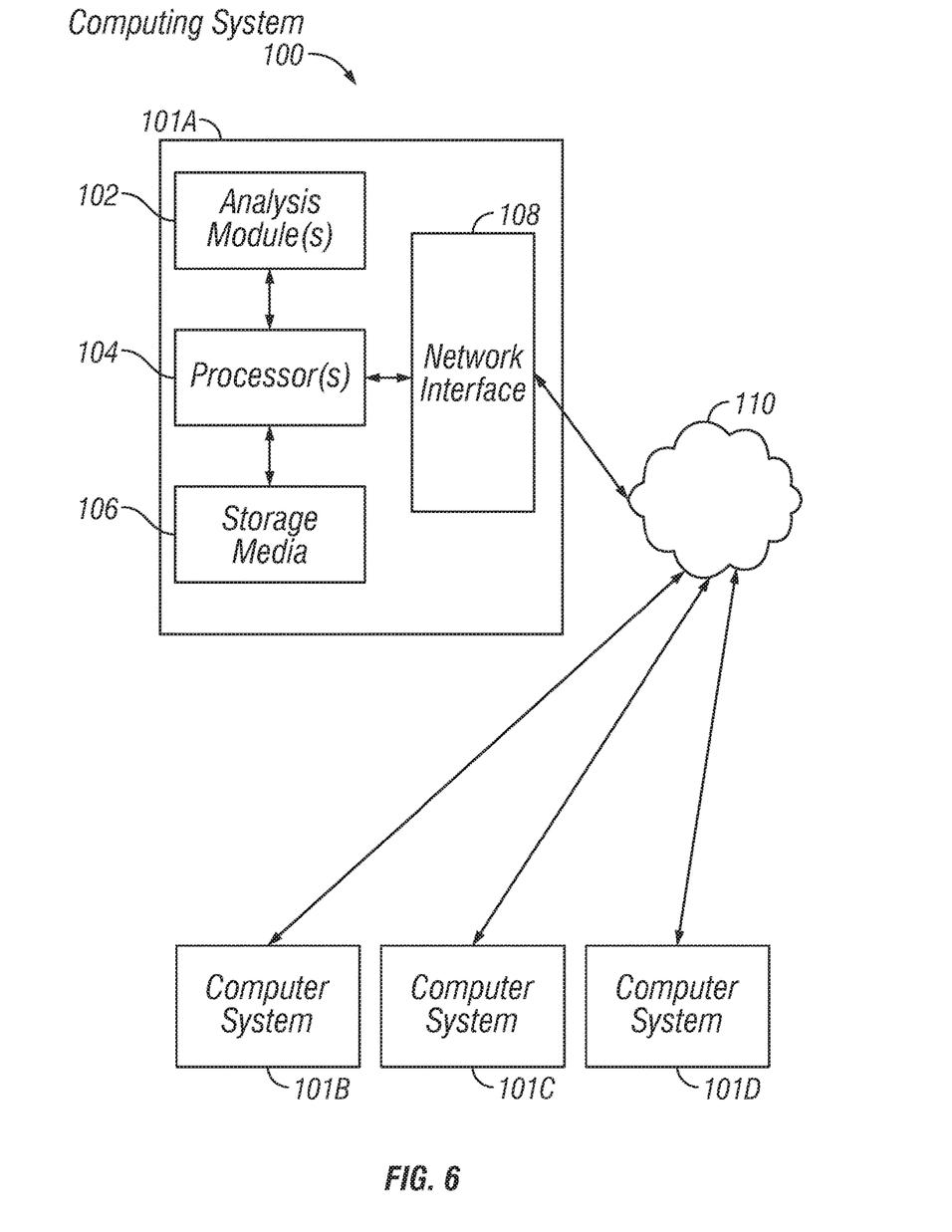
FIG. 6 shows a computer system that may be used to make depth-related parameter determinations according to some embodiments.

FIG. 6 shows an example computing system 100 in accordance with some embodiments such as those to be explained with reference to FIG. 1A and FIG. 1B. The computing system 100 can be an individual computer system 101A or an arrangement of distributed computer systems. The computer system 101A includes one or more analysis modules 102 that are configured to perform various tasks according to some embodiments, such as the tasks described above. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents).

Any one or more of the computer systems may be disposed in the well logging instrument (whether wireline as in FIG. 1A or LWD as in FIG. 1B).

A processor can include a microprocessor, microcontroller, processor module or subsystem, programmable integrated circuit, programmable gate array, digital signal processor (DSP), or another control or computing device.

The storage media 106 can be implemented as one or more non-transitory computer-readable or machine-readable storage media. Note that while in the embodiment of FIG. 6 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 6, and/or computing system 100 may have a different configuration or arrangement of the components depicted in FIG. 4. The various components shown in FIG. 6 may be implemented in hardware, software, or a combination of both hardware and software, including one or more signal processing and/or application specific integrated circuits.

Further, the steps in the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a depth related parameter of an instrument in a wellbore, comprising:

measuring movement of the instrument along the wellbore using a wheel sensor urged into contact with a wall of the wellbore;

measuring movement of an instrument conveyance proximate the surface;

calibrating measurements from the wheel sensor using measurements of movement of the instrument conveyance; and determining the depth related parameter of the instrument using the calibrated wheel sensor measurements.

2. The method of claim 1 further comprising measuring acceleration of the instrument and using the measured acceleration, the measurements from the wheel sensor and the measurements of movement of the conveyance to determine the depth related parameter of the instrument in the wellbore.

3. The method of claim 2 further comprising using the measurements of acceleration measurements from the wheel sensor to determine intervals in which the instrument is stopped within the wellbore.

4. The method of claim 2 further comprising determining intervals of degraded measurements from the wheel sensor when continued instrument motion is determined from the acceleration measurements.

5. The method of claim 2 further comprising comparing the measurements of the acceleration related parameter and measurements of a parameter related to motion of the wheel sensor, and using the measurements of the parameter related to motion of the wheel sensor to determine the instrument depth related parameter when a difference between the measured acceleration and the wheel sensor motion related parameter falls below a selected threshold.

6. The method of claim 5 further comprising using only the measured acceleration related parameter and measured instrument conveyance movement to determine motion at the instrument when the difference exceeds the same or a different selected threshold.

7. The method of claim 1 wherein the conveyance movement measurements comprise measurements of rotation of a contact wheel in contact with a cable.

8. The method of claim 1 wherein the conveyance movement measurements comprise measurements of movement of at least one of a kelly, a swivel and a top drive.

9. The method of claim 1 wherein the conveyance movement measurements comprise measurements of movement of the injector head of a coiled tubing unit.

10. The method of claim 1 further comprising using the determined depth related parameter for geological interpretation of a formation around the wellbore.

11. The method of claim 10 wherein the instrument comprises an electrical formation imaging tool.

12. The method of claim 11 wherein the geological interpretation comprises detecting fractures intersecting a wellbore wall.

13. The method of claim 1 further comprising using the determined depth related parameter to depth align sensor data from formation sensors that are longitudinally offset on the instrument.

* * * * *